United States Patent
Kim (10) Patent No.: US 7,389,469 B2
(45) Date of Patent: Jun. 17, 2008

(54) BUS SYSTEMS, APPARATUSES, AND METHODS OF OPERATING A BUS

(75) Inventor: Nam-Hyun Kim, Uiwang-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 482 days.

(21) Appl. No.: 11/142,182

(22) Filed: Jun. 2, 2005

(65) Prior Publication Data
US 2006/0007853 A1    Jan. 12, 2006

(30) Foreign Application Priority Data
Jun. 15, 2004    (KR) .................... 10-2004-0043844

(51) Int. Cl.
*H03M 13/00*    (2006.01)
(52) U.S. Cl. ............. 714/785; 714/758; 714/748; 714/749; 714/750; 370/216; 370/438; 370/439; 702/189; 710/32; 710/100
(58) Field of Classification Search .......... 714/758, 714/748, 749, 750, 761, 701, 785; 370/216; 702/189; 710/32, 100; 709/200–203
See application file for complete search history.

(56) References Cited

U.S. PATENT DOCUMENTS 6,956,864 B1 * 10/2005 Nankou et al. ............. 370/438
7,213,180 B2 * 5/2007 Nakamura .................. 714/52
2003/0123389 A1 * 7/2003 Russell et al. ............. 370/230
2005/0257117 A1 * 11/2005 Chiang ....................... 714/758

FOREIGN PATENT DOCUMENTS

| EP | 1 223 712 | 7/2002 |
| JP | 2001-175546 | 6/2001 |
| KR | 2002-0081887 | 10/2002 |
| WO | WO 01/06711 | 1/2001 |

OTHER PUBLICATIONS

Lin et al. 'RMTP: a reliable multicast transport protocol,' Infocom '96. Fifteenth Annual Joint Conference of the IEEE Computer Societies. Networking the Next Generation. Proceedings IEEE; vol. 3, Mar. 24-28, 1996 pp. 1414-1424.*

* cited by examiner

*Primary Examiner*—Guy J. Lamarre
(74) *Attorney, Agent, or Firm*—Harness, Dickey & Pierce, P.L.C.

(57) ABSTRACT

Data transmission between transmitting/receiving nodes in a bus system may be controlled based on an error check of received data. When an error in the received data is detected, the transmitting node may cease data transmission, and other nodes, which may not have detected the error, may be notified of the detected error.

23 Claims, 7 Drawing Sheets

BUS SYSTEMS, APPARATUSES, AND METHODS OF OPERATING A BUS

PRIORITY STATEMENT

This application claims priority to Korean Patent Application No. 2004-0043844 filed on Jun. 15, 2004 in the Korean intellectual property Office (KIPO), the entire contents of which are hereby incorporated herein by reference.

BACKGROUND

1. Field of the Invention

Example embodiments of the present invention relate to bus systems, bus apparatuses, and methods of operating bus systems.

2. Description of the Related Art

A bus allows for a communication channel to be shared by several devices. For example, physically, a bus may be a group of communication wires, which connects several devices to each other, either, in parallel or in serial, according to a bus specification. In another example, a bus may be a protocol for data transmission between transmitters and receivers.

For data transmission, a cyclic redundancy check (CRC) may be used to detect data transmission failure. For example, a data transmitter may compute a CRC code of data to be transmitted and may append the computed CRC code to the transmitted data, for example, in a portion of the data known as the header. The data receiver may receive the transmitted data with the CRC code and compute the CRC code to compare the computed CRC code with the received CRC code appended to the received data. The integrity of the received data may be determined based on the comparison.

The data transmitter and the data receiver may divide data transferred therebetween into multiple segments each of which may include data having a given length. Each segment (e.g., packet, frame, etc.) may include a data header and a data body. The data receiver may compute the CRC code of data header and the CRC code of the data body to compare with the received CRC codes of the data header and the data body, respectively, to determine an integrity of the received data.

Bus protocols may also be adopted for a multi-layered bus architecture. In a multi-layered bus architecture, a bus component, which belongs to a lower layer such as a physical layer, may operate in response to a request from an upper layer such as a logical layer.

As sizes of digital data and/or device performance are increased, increased speed in transmitting data may be needed for a bus interface in order to accommodate various types of devices (e.g., transmitters and/or receivers, etc.). For example, bus usage time for each bus device may be decreased such that other bus devices may have more opportunities to use limited bus resources shared by multiple bus devices. In current bus systems and/or specifications, the CRC may not increase an efficiency of the bus.

For example, the IEEE-1394 bus standard enables increased speed data transmission between various digital devices such as a personal computer, digital camcorder, personal digital assistant (PDA), etc. The IEEE-1394 bus may utilize a tree type or daisy-chain type topology, and may support data rates up to, for example, 400 Mbps.

A node (e.g., transmitting and/or receiving) conforming to the IEEE-1394 standard may include a lower layer, for example, a physical layer (PHY layer) and an upper layer, for example, a link layer (LINK layer). The PHY layer and the LINK layer may each be implemented on a chip, and the node may include a PHY layer chip and a LINK layer chip.

In operation, the PHY layer chip may initialize the bus, encode and decode data, perform bus arbitration and/or generate and detect a bias voltage. The LINK layer chip may perform CRC computation, CRC error detection, and data packet generation and detection.

Figure 1:
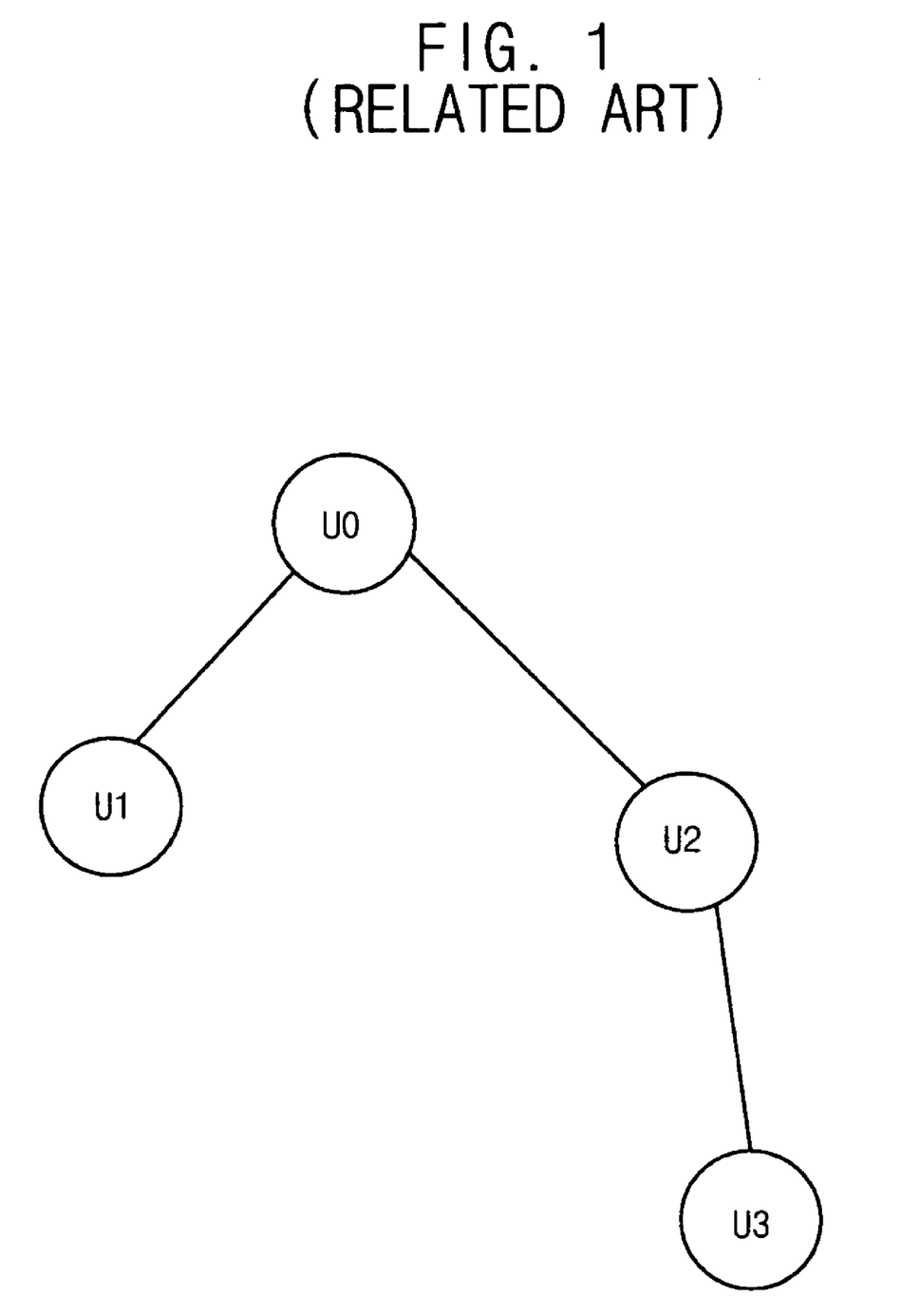
FIG. 1 is a schematic diagram illustrating an example related art bus network topology.

FIG. 1 is a schematic diagram illustrating an example related art IEEE-1394 network topology.

Referring to FIG. 1, each of nodes U0, U1, U2 and U3 may represent a system adapted to transfer data according to the IEEE-1394 protocol. Each of the nodes U0, U1, U2, and U3 may have an input and an output port for data transfer. As shown in FIG. 1, the node U0 may serve as a root node, which may be positioned on a top (e.g., vertex) of the network topology, and may serve as an arbiter for the bus. When a node other than the root node U0, for example, the node U1, needs to transmit data via the bus, the node U1 may send a bus request to the node U0. The node U0 may perform bus arbitration and may send a bus grant the node U1. The node U1 may receive the bus grant from the root node U0, and data may transmit data to another node (e.g., U2, U3, etc.) via the bus. The transmitting node U1 may continue to transmit data and the receiving nodes (e.g., U2, U3, etc.) may receive data during a data transmission duration time, which may be specified by IEEE-1394 specification (e.g., 20 ms).

Each of the nodes U0, U2, U3 may individually determine whether received data is intended for itself by checking address information included in a header of the received data. When a CRC error is detected in a header of the received data, the remaining data no longer needs to be transmitted from the transmitting node U1 or received by the receiving nodes U0, U2 and U3. However, in related art bus systems (e.g., according to the IEEE-1394 bus standard), the transmitting node U1 may continue to transmit data and the receiving nodes U0, U2 and U3 continue to receive the data during the entire data transmission duration time. As a result, bus resources may be unnecessarily wasted during at least one data transmission duration time.

Figure 2:
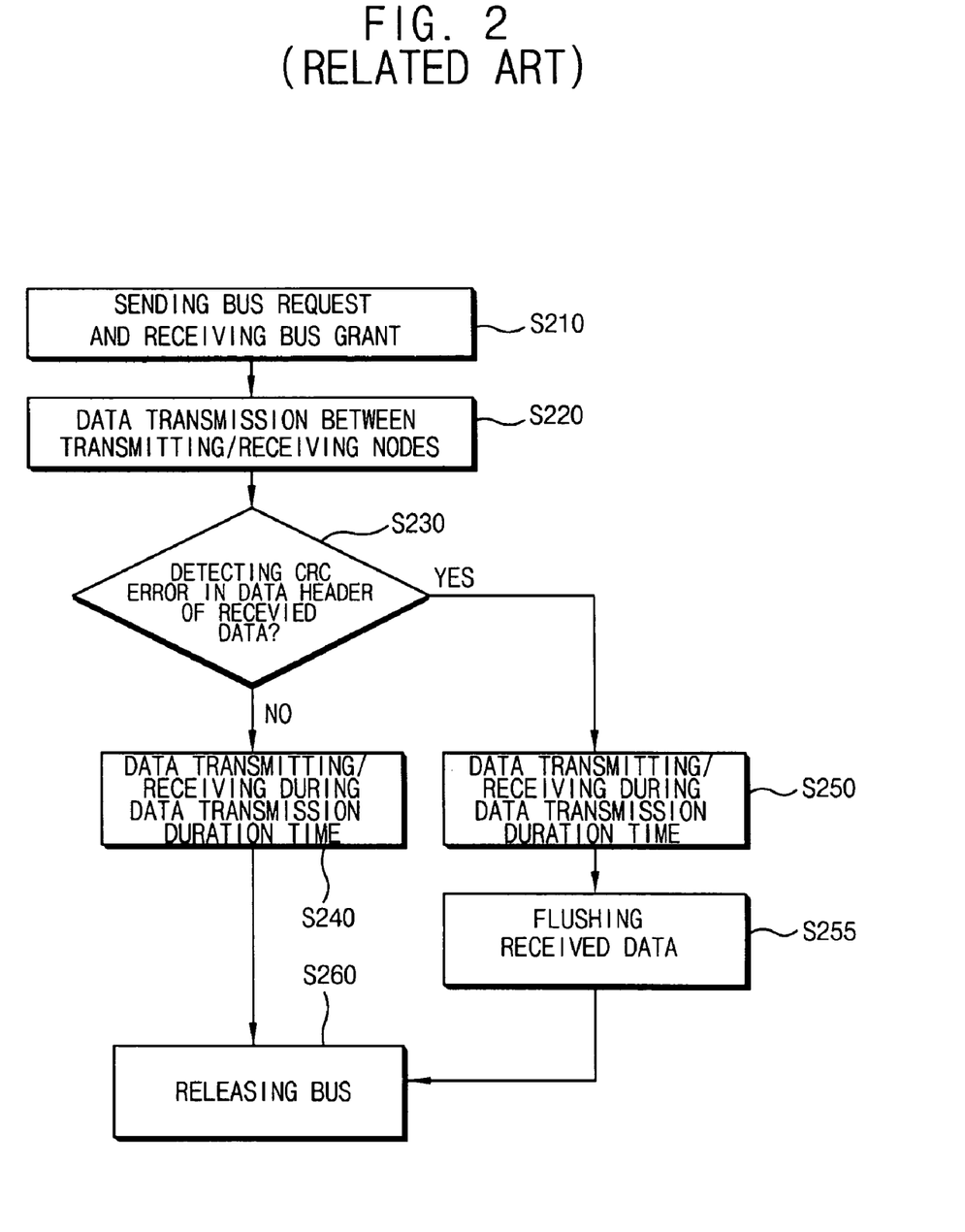
FIG. 2 is a flow chart illustrating a related art data transmission process in a related art bus system.

FIG. 2 is a flow chart illustrating a related art data transmission process for a related art bus system (e.g., according to the IEEE-1394 standard).

Referring to FIG. 2, at S210, a transmitting node may send a bus request command to a root node and may receive a bus grant command from the root node.

At S220, the transmitting node, granted bus usage by the root node, may start transmitting data via the bus and other remaining nodes (e.g., receiving nodes) may start to receive data. At S230, the receiving nodes may verify an integrity of received data by checking a CRC of a data header included in the received data.

However, regardless of whether the CRC error is detected, the receiving nodes continue to receive data during data transmission duration time (e.g., S240 and S250). When a CRC error is detected, the received data may be flushed, at S255, the bus may be released by the transmitting node, at S260, and the process may restart from S210.

When a CRC error is not detected in the data header, the bus may be released by the transmitting node, at S260, and the process may restart at S210. The above described process may be repeated, for example, each time a transmitting node sends a bus request command to a root node.

SUMMARY OF THE INVENTION

Example embodiments of the present invention provide bus systems, apparatuses, and methods of operating bus systems, which may achieves higher data transmission speed and/or to increase bus efficiency.

In an example embodiment of the present invention, a method of operating a bus system may include receiving data from a transmitting node via a bus, detecting a transmission error in a data header of the received data, ceasing to receive the data and releasing the bus in response to the detected transmission error, and notifying the transmitting node and at least one second receiving node, which may not have already detected the transmission error, of the detected transmission error.

Another example embodiment of the present invention provides an apparatus for transmitting and receiving data over a bus, which may include a lower layer and an upper layer. The lower layer unit may receive data including a data header via a bus. The upper layer unit may detect a transmission error in the received data header, and notify the lower layer unit of the detected transmission error. The lower layer unit may also notify a transmitting node and at least one node also receiving the data of the detected transmission error in response to the notification received from the upper layer unit.

Another example embodiment of the present invention provides a bus system, which may include transmitting node, at least one first receiving node, and at least one second receiving node. The transmitting node may transmit data over a bus, and the at least one first and at least one second receiving node may receive data over a bus. The at least one first receiving node may also receive data over the bus, detect an transmission error in a data header of the received data, and notify the transmitting node and the at least one second receiving node of the detected transmission error.

In example embodiments of the present invention, the received data may be received by a lower layer of at least one first receiving node, the transmission error may be detected at an upper layer of the at least one first receiving node. The lower layer of the at least one first receiving node may be notified of the detected transmission error, and the at least one first receiving node may cease to receive data and release the bus in response to the notification.

In example embodiments of the present invention, the transmitting node and the at least one second receiving node may receive the notification of the detected transmission error via a second lower layer and a third lower layer, respectively.

In example embodiments of the present invention, the lower layer of the at least one first receiving node may be a physical layer coupled to the bus, and the upper layer of the at least one first receiving node may be a logical layer for processing the received data received by the lower layer.

In example embodiments of the present invention, each of the second lower layer and the third lower layer may be a physical layer coupled to the bus.

In example embodiments of the present invention, the physical layer may be a PHY layer of an IEEE-1394 standard and the logical layer may be a LINK layer of the IEEE-1394 standard.

In example embodiments of the present invention, the transmission error may be a cyclic redundancy check (CRC) error, which may be detected by performing a cyclic redundancy check (CRC) on the received data.

In example embodiments of the present invention, the lower layer may be notified of the detected transmission by setting at least one bit of a register to a value, wherein the at least one bit having the value may be indicative of the detected transmission error.

In example embodiments of the present invention, the at least one bit of the register may be at least one reserved bit in a register map and the at least one bit may be set using a write signal.

In example embodiments of the present invention, the at least one first receiving node may cease receiving data, and release the bus by transitioning the lower layer of the at least one first receiving node to an idle state.

In example embodiments of the present invention, the transmitting node and the at least one second receiving node may be notified of the detected transmission error via a reset signal indicative of the detected transmission error to the transmitting node and the at least one second receiving node. The reset signal may be a non-arbitrated short bus reset signal (SBR).

In example embodiments of the present invention, the second lower layer of the transmitting node and the third lower layer of the at least one second receiving node may be notified of the detected transmission error by generating, at the transmitting node and the at least one receiving node, a reset signal indicative of the detected transmission error, and repeating the reset signal by the transmitting node and the at least one second receiving node to notify lower nodes of the transmitting node and the at least one second receiving node of the detected transmission error.

Example embodiments of the present invention may further include ceasing to transmit the data, releasing the bus, at the transmitting node, and repeating the notification of the detected transmission error to a second upper layer of the transmitting node, in response to the notification of the detected transmission error from the at least one first receiving node, and ceasing to receive the data, releasing the bus, at the at least one second receiving node, and repeating the notification of the detected transmission error to a third upper layer of the at least one second receiving node, in response to the repeated notification of the detected transmission error.

In example embodiments of the present invention, transmission of the data may be ceased and the bus may be released by the transmitting node and/or the at least one second receiving node by transitioning the transmitting node and/pr the at least one second receiving node to an idle state.

Example embodiments of the present invention may further include notifying a second upper layer of the transmitting node of the detected transmission error, by setting at least one bit of a register of the second lower layer of the transmitting node to a value, and sending a signal to the second upper layer of the transmitting node. The at least one bit of the register of the second lower layer of the transmitting node may be at least one reserved bit in a register map and the signal may be a link signal.

Example embodiments of the present invention may further include notifying a third upper layer of the at least one second receiving node of the detected transmission error by setting at least one bit of a register of the third lower layer to a value, and sending a signal to the third upper layer. The at least one bit of the register of the third lower layer may be at least one reserved bit in a register map and the signal may be a link signal.

BRIEF DESCRIPTION OF THE DRAWINGS

Example embodiments of the present invention will become more apparent to those of ordinary skill in the art by describing, in detail, the attached drawings, wherein like elements are represented by like reference numerals, which are given by way of illustration only and thus do not limit the example embodiments of the present invention.

DETAILED DESCRIPTION OF EXAMPLE EMBODIMENTS OF THE PRESENT INVENTION

Figure 3:
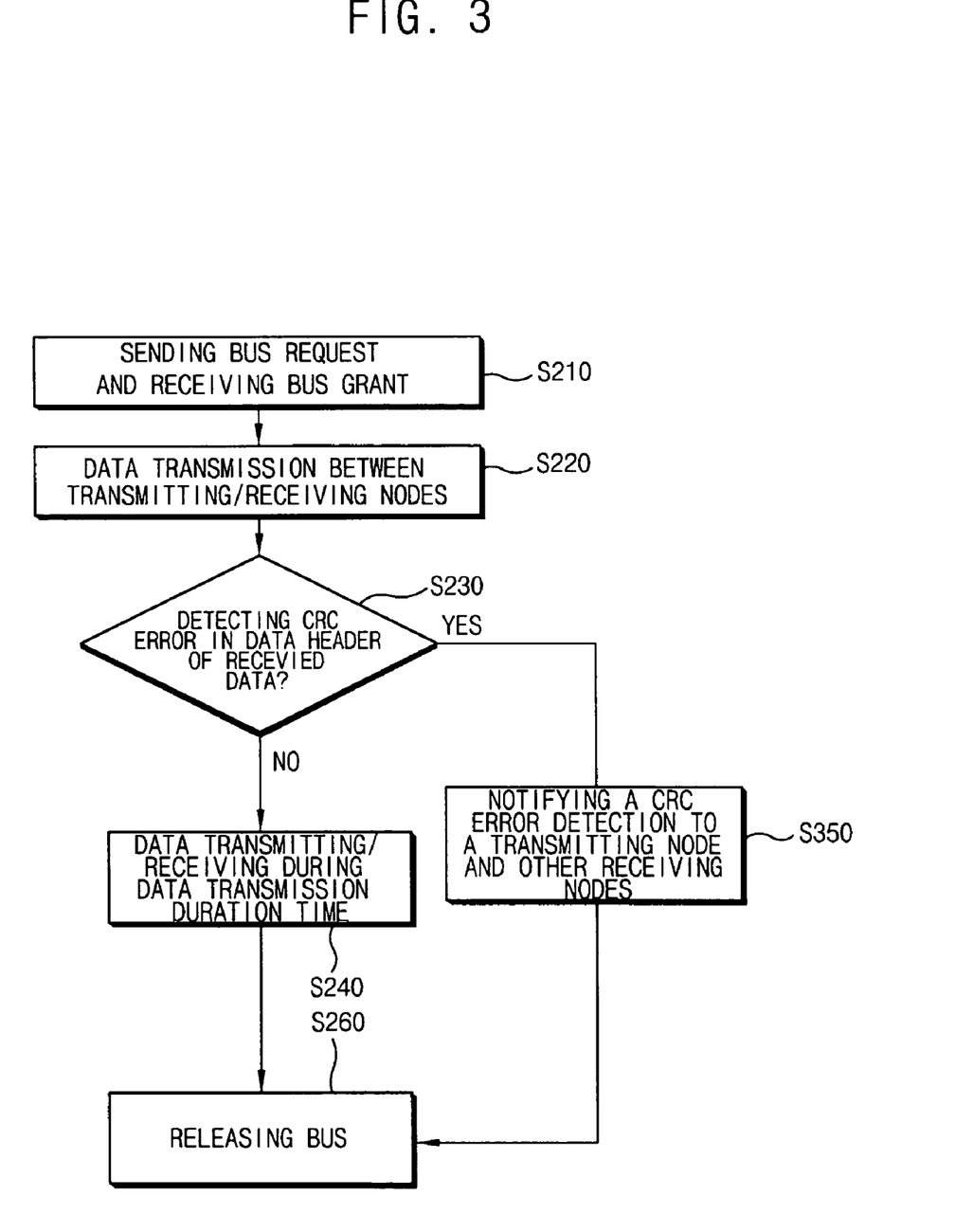
FIG. 3 is a flow chart illustrating a data transmission process, according to an example embodiment of the present invention.

FIG. 3 is a flow chart illustrating a data transmission process, according to an example embodiment of the present invention.

Referring to FIG. 3, S210, S220, S230 and S260 may be similar, or substantially similar, to the S210, S220, S230, and S260 shown and represented by the same reference numerals in FIG. 2.

At S230, receiving nodes may receive data, and verify an integrity of received data by checking a CRC in a data header of the received data. When CRC error is detected in the data header, the transmitting node for transmitting data may stop transmitting data and the nodes may be notified via the CRC error detection in the data header of the received data, at S350.

When the CRC error is not detected in the data header, all receiving nodes may continue to receive data for the duration of the data transmission time, at S240.

The bus may be released from the node transmitting data, at S260, and a the process may restart at S210, for example, upon reception of another bus request.

Figure 4:
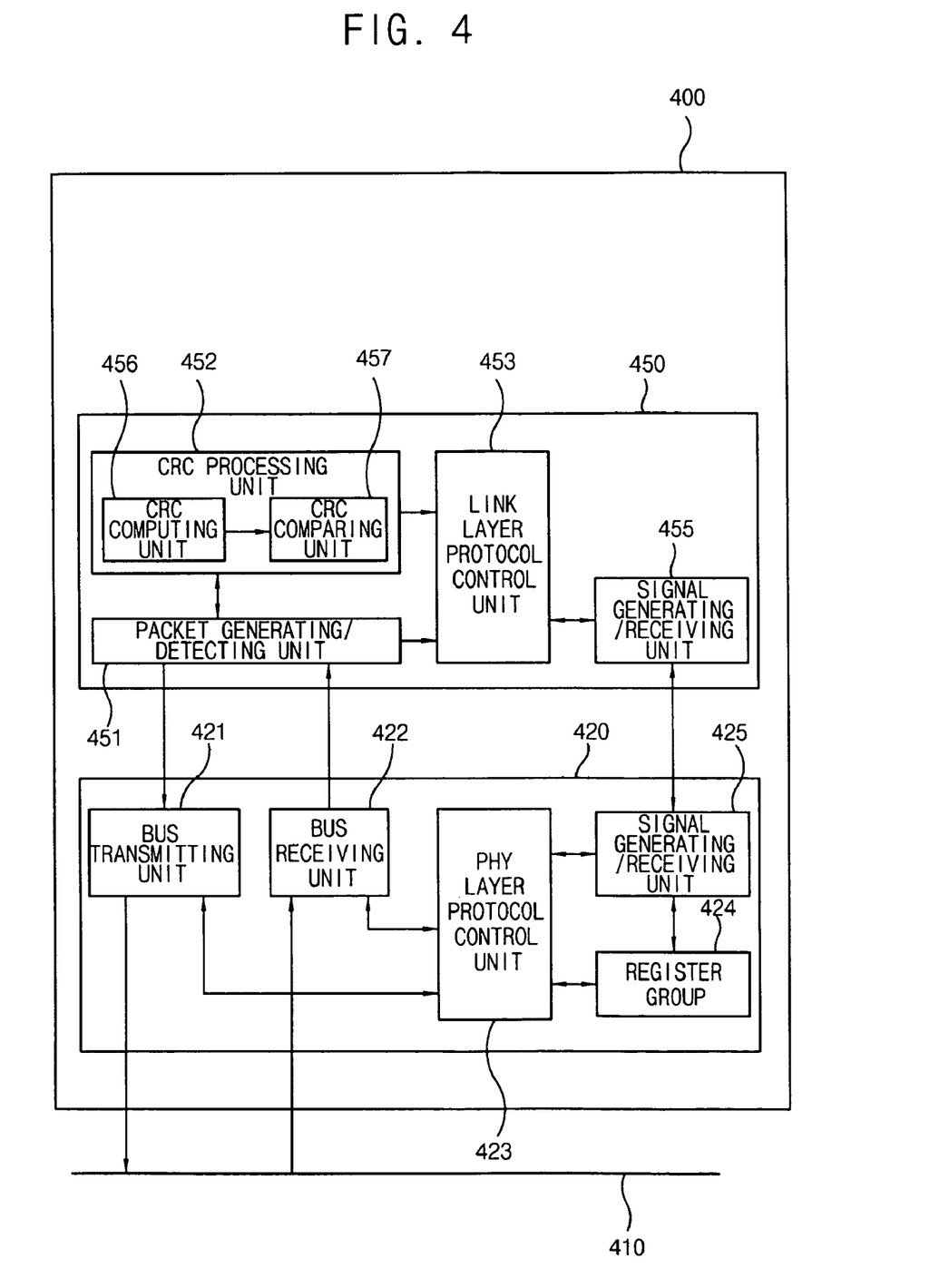
FIG. 4 is a block diagram illustrating a node, implemented according to an IEEE-1394 standard.

FIG. 4 is a block diagram illustrating a node or bus apparatus implemented according to the IEEE-1394 standard. Although example embodiments of the present invention will be discussed herein with regard to a IEEE-1394 standard, it will be understood that example embodiments of the present invention may be implemented, or used in conjunction with any suitable bus protocol.

Referring to FIG. 4, a node 400, which may be implemented according to IEEE-1394, may include a lower layer, for example, a physical layer (PHY) 420 and an upper layer, for example, a link layer (LINK) 450. The node 400 may be coupled to a bus 410.

The PHY layer 420 may include a bus transmitting unit 421, a bus receiving unit 422, a PHY layer protocol control unit 423, a register group 424 and a signal generating/receiving unit 425.

The LINK layer 450 may include a packet generating/detecting unit 451, a CRC processing unit 452, a LINK layer protocol control unit 453 and a signal generating/receiving unit 455. The CRC processing unit 452 may further include a CRC computing unit 456 and a CRC comparing unit 457.

The bus transmitting unit 421, of the PHY layer 420, may be coupled to the packet generating/detecting unit 451, and may transmit a packet generated by the packet generating/detecting unit 451 via the bus 410. The bus receiving unit 422 may be coupled to the packet generating/detecting unit 451 to transmit a packet received via the bus 410 to the packet generating/detecting unit 451. The bus transmitting unit 421 and/or the bus receiving unit 422 may include respective signal processing circuits, for example, data encoders and/or decoders for data transmission via the bus 410, however, for simplicity, these are not shown in FIG. 4.

The register group 424 may represent one or more registers (e.g., a set of registers) for use in the PHY layer 420.

The PHY layer protocol control unit 423 may be coupled to all, or substantially all, respective components of the PHY layer 420 and may control operations of all, or substantially all, of the components of the PHY layer 420. For example, the PHY layer protocol control unit may be implemented according to an IEEE-1394 PHY-layer specification, although any other suitable bus protocol may be used.

The signal generating/receiving unit 425 and the signal generating/receiving unit 455 may communicate control signals to and from the PHY layer 420 and the LINK layer 450.

The packet generating/detecting unit 451 may detect packets in a data stream received from the bus receiving unit 422, and/or generate packets based on data received from, for example, an upper layer relative to the LINK layer 450. The packet generating/detecting unit 451 may provide the generated packet to the PHY layer 420. The packets detected by the packet generating/detecting unit 451 may be forwarded to the CRC processing unit 452 and the integrity of the packets may be verified by the CRC computing unit 456 and the CRC comparing unit 457.

The LINK layer protocol control unit 453 may be a component corresponding to the PHY layer protocol control unit 423. For example, the LINK layer protocol control unit 453 may be coupled to all, or substantially all, respective components of the LINK layer 450 and may control operations of all, or substantially all, of the components of the LINK layer 450.

A method for data transmission, according to example embodiments of the present invention may be implemented, for example, by modifying operations of the PHY layer protocol control unit 423 and the LINK layer protocol unit 453.

Figure 5:
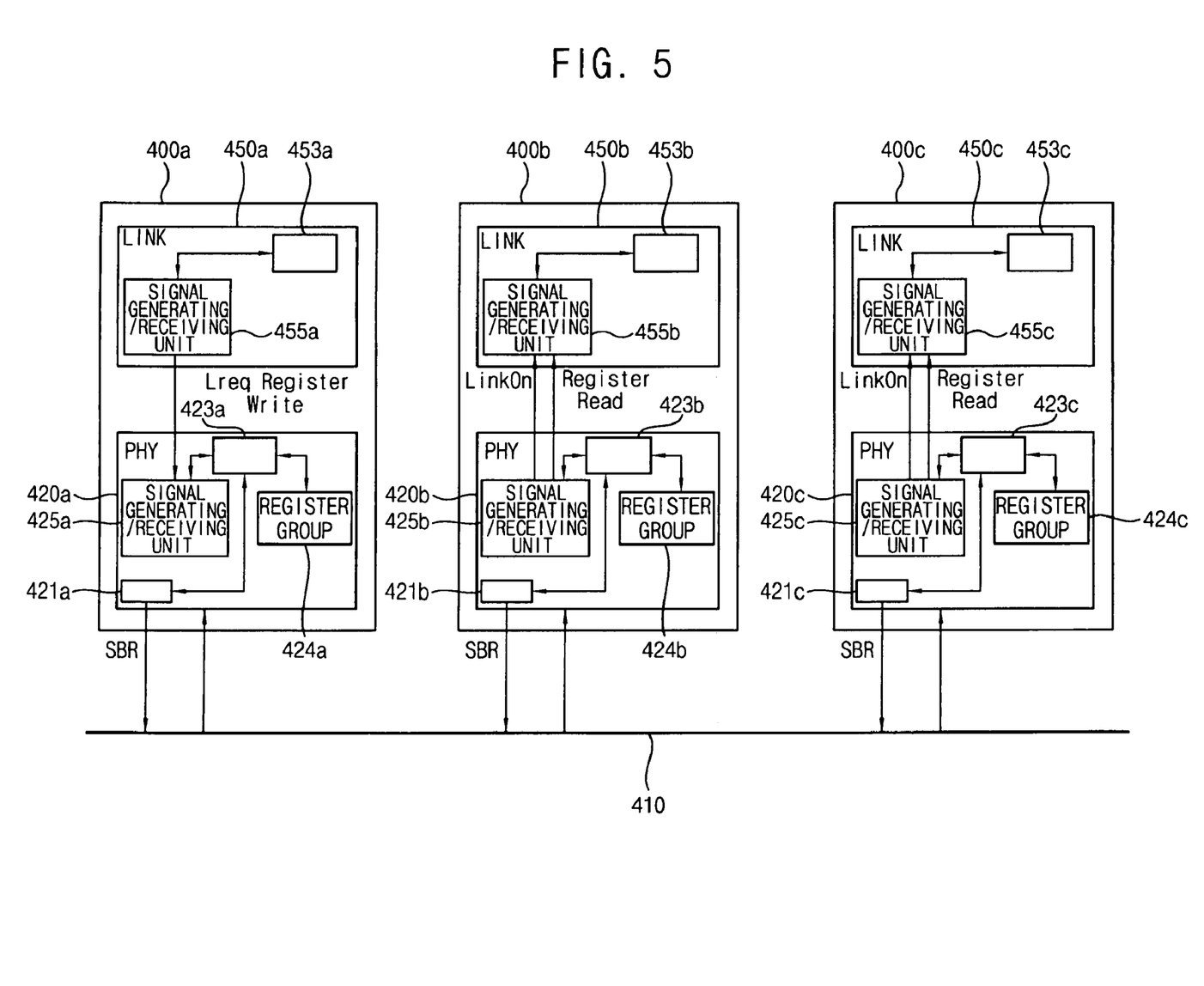
FIG. 5 is a block diagram illustrating a signal flow between transmitting/receiving nodes, according to an example embodiment of the present invention.

FIG. 5 is a block diagram illustrating a signal flow between transmitting/receiving nodes, according to an example embodiment of the present invention.

Referring to FIG. 5, a receiving node 400a may be a receiving node that may detect a CRC error in a data header of received data. A node 400b may be a transmitting node that may transmit data via a bus 410. A node 400c may be a remaining receiving node, for example, a node that may not detect the CRC error in the data header of the received data. Although illustrated as a single node, it will be understood that the receiving node 400a, the transmitting node 400b, and/or the receiving node 400c may be representative of a plurality of nodes.

Each of the nodes 400a, 400b and 400c may include a PHY layer and a LINK layer. For example, the node 400a may include the PHY layer 420a and the LINK layer 450a.

Similarly, the node 400b may include the PHY layer 420b and the LINK layer 450b, and the node 400c may include the PHY layer 420c and the LINK layer 450c.

In the receiving node 400a, the LINK layer 450a may detect a CRC error in a data header of data received from the PHY layer 420a, and may notify (e.g., immediately or instantaneously) the PHY layer 420a of the detected CRC error. For example, in response to the detection of the CRC error, the LINK layer may reassign at least one bit of a register within a register group 424a in the PHY layer 420a to a specific value. The PHY layer 420a may check (e.g., periodically check) whether at least one bit of a register of the register group 424a has been designated to have the specific value to determine if the LINK layer 450a has detected a CRC error. If at least one bit has been set to the specific value, the PHY layer 420a may be notified of the CRC error detection.

In order to reassign the bit of a register within the register group 424a, the LINK layer 450a may use, for example, a write signal (e.g., an Lreq Register Write signal defined in the IEEE-1394 specification, although any other suitable register may be used). For example, the LINK layer protocol control unit 453a may send the write signal to the PHY layer protocol control unit 423a via the signal generating/receiving unit 455a, and the signal generating/receiving unit 425a. The PHY layer protocol control unit 423a may reassign at least one bit of a register within the register group 424a to the specific value based on the write signal.

The PHY layer 420a may be notified that the CRC error within the data header has been detected at the LINK layer 450a, and the remaining nodes, for example, node 400b and node 400c may also be notified of the detected CRC error.

In order to notify the CRC error detection to node 400b and node 400c, the PHY layer 420a may use, for example, a reset signal (e.g., a non-arbitrated short bus reset signal defined in the IEEE-1394 specification, although any other suitable reset signal and/or bus specification may be used). For example, the PHY layer protocol control unit 425a may output the reset signal (SBR) to the bus 410 via a bus transmitting unit 421a.

The PHY layer 420a may release the bus 410 and a status of the node 400a may transition to an idle state (e.g., A0:Idle state in the IEEE-1394 specification).

In the transmitting node 400b, when the PHY layer 420b detects the reset signal (e.g., the non-arbitrated short bus reset signal) (SBR), the PHY layer 420b may set at least one bit of a register of a register group 424b to a specific value in order to notify the LINK layer 450b that a reset signal (e.g., the non-arbitrated short bus reset signal) (SBR) has been detected.

For example, if the node 400b is in accordance with the IEEE-1394 standard, a tree type topology or a daisy-chain type topology may be used, and the node 400b, which may receive the reset signal (SBR), may transmit (e.g., relay or repeat) the reset signal (SBR) to lower nodes connected in the tree type or the daisy-chain type topology. The reset signal (SBR) need not be reported, for example, in other network topologies, for example, parallel bus systems.

The PHY layer 420b may release the bus 410 and a status of the node 400b may transition to an idle state (e.g., A0:Idle state of the IEEE-1394 specification). The PHY layer 420b may transmit a signal to the LINK layer 450b, and the LINK layer 450b may check whether a bit of a register of the register group 424b has been set to a specific value. For example, the PHY layer 420b may transmit a link signal (e.g., a LinkOn signal defined in the IEEE-1394 specification) to the LINK layer 450b. The LINK layer 450b may receive the link signal via the signal generating/receiving unit 425b and the signal generating/receiving unit 455b, and the LINK layer 450b may check a bit value of the bit of a register within the register group 424b. When the bit of a register within the register group 424b has the specific value, the CRC error in the data header may be recognized and a bus interface (e.g., a Phy2Link interface) of the node 400b may be released.

The receiving node 400c may not detect the CRC error in the data header, and the signal processing of the node 400c may be similar, or substantially similar, to the processing described above with respect to node 400b.

When the PHY layer 420c detects a reset signal (e.g., a non-arbitrated short bus reset signal) (SBR), the PHY layer 420c may set at least one bit within a register of a register group 424c to a specific value in order to notify the LINK layer 450c of the detected reset signal (e.g., non-arbitrated short bus reset signal) (SBR).

The PHY layer 420c may repeat the reset signal (e.g., the non-arbitrated short bus reset signal) (SBR) in order for other nodes (not shown) to receive the reset signal.

The PHY layer 420c may release the bus 410 and a status of the node 400c may transition to an idle state (e.g., A0:Idle state of the IEEE-1394 specification). The PHY layer 420c may transmit a link signal (e.g., a LinkOn signal of the IEEE-1394 specification) to the LINK layer 450c via the signal generating/receiving unit 425c and the signal generating/receiving unit 455c, and the LINK layer 450c may check if a bit of a register within the register group 424c has been set to a specific value. If a bit within a register of the register group 424c has set to the specific value, the received data having the CRC error in the data header may be flushed.

Figure 6A:
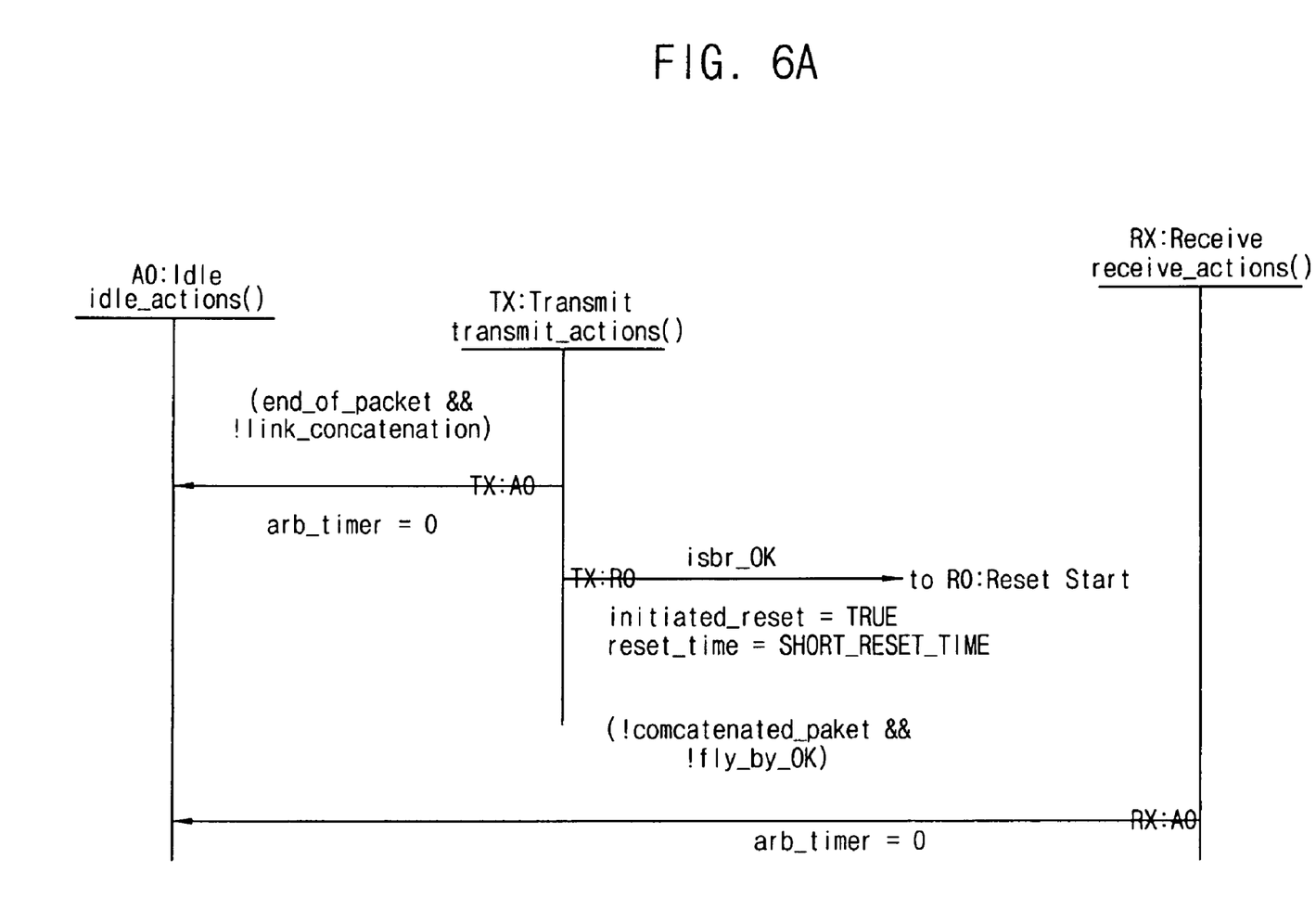
FIG. 6A is a schematic status transition diagram of a PHY layer implemented according to an IEEE-1394 protocol.

FIG. 6A is a schematic status transition diagram of the PHY layer, according to the IEEE-1394 protocol.

Referring to FIG. 6A, when a condition (e.g., (end_of_packet && !link_concatenation)) is fulfilled, the PHY layer may be transitioned from a transmit state (e.g., (TX:Transmit)) to an idle state (e.g., (A0:Idle)). When another condition (e.g., (!concatenated_packet && !fly_by_OK)) is satisfied, the PHY layer may be transitioned from a receive state (e.g., (RX:Receive)) to the idle state (e.g., (A0:Idle)).

As discussed above, the reset signal (e.g., non-arbitrated short bus reset signal defined in the IEEE-1394 standard) (SBR) may be used by the node, which detects the CRC error in the data header of the received data, to notify all, or substantially all, other nodes of the detected CRC error.

To use the reset signal (e.g., non-arbitrated short bus reset signal) (SBR) to notify of the detected CRC error, conditions of the status transition may be modified such that the reset signal (e.g., non-arbitrated short bus reset signal) (SBR) may be included in the conditions of the status transition. The reset signal (e.g., non-arbitrated short bus reset signal) (SBR) may be any related art bus reset signal, for example, according to the IEEE-1394 or any other suitable standard protocol.

Figure 6B:
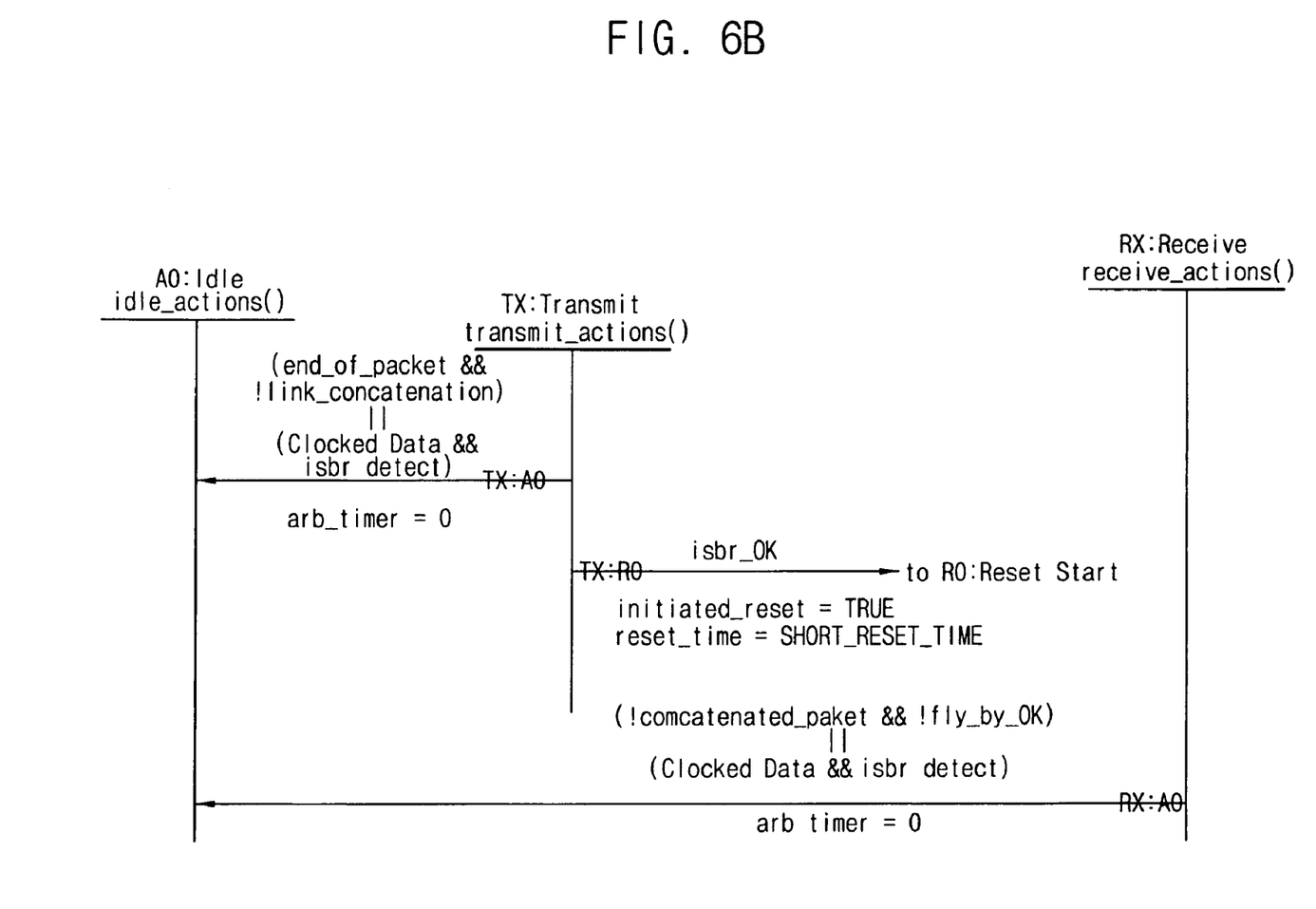
FIG. 6B is a schematic status transition diagram of a PHY layer, according to an example embodiment of the present invention.

FIG. 6B is a schematic status transition diagram of the PHY layer implemented, according to an example embodiment of the present invention.

Referring to FIG. 6B, when a condition (e.g., (end_of_packet && !link_concatenation)||(Clocked Data && isbr detected)) is satisfied, the PHY layer may transition from the transmit state (e.g., (TX:Transmit)) to the idle state (e.g., (A0:Idle)). When another condition (e.g., (!concatenated_packet && !fly_by_OK)||(Clocked Data && isbr detected)) is satisfied, the PHY layer may transition from the receive state (e.g., (RX:Receive)) to the idle state (e.g., (A0:Idle)).

For example, the condition (e.g., (Clocked Data && isbr detected)) may indicate that the reset signal (e.g., non-arbitrated short bus reset signal) (SBR) has been generated during a transmission of clocked data, and the generated reset signal (e.g., non-arbitrated short bus reset signal) (SBR) may be used for transitioning to the idle state (e.g., (A0:Idle)). The reset signal (e.g., non-arbitrated short bus reset signal) (SBR) generated when the clocked data may not be transmitted, may be processed in the same, or substantially the same manner, as any related art bus reset signal, for example, according to the IEEE-1394 or any other suitable standard protocol.

The condition (e.g., (Clocked Data && isbr detected)) may be added to the related art transition conditions by an OR operator (e.g., (||)). The condition (e.g., (Clocked Data && isbr detected)) may not interfere with operations defined in, for example, the IEEE-1394, or any related art bus protocol.

According to example embodiments of the present invention, when the CRC error is detected in the data header of the received data, the transmitting node may cease (e.g., immediately cease) a data transmission and release the bus, which may result in increased utilization of bus resources and/or increased efficiency of bus usage.

Example embodiments of the present invention have been described with regard to the IEEE-1394 standard. However, it will be understood that example embodiments of the present invention may be used in conjunction with any suitable bus protocol, architecture, standard, etc.

As discussed herein, FIG. 5 illustrates a bus system, according to an example embodiment of the present invention, which may include receiving node 400a, transmitting node 400b, and receiving node 400c. However, it will be understood that these nodes may be interchangeable, and may operate in the same, or substantially the same, manner. For example, each node 400a, 400b, and/or 400c, may be a transmitting node, receiving node, or a transmitting/receiving node. Further, it will be understood that each of the nodes 400a, 400b, and/or 400c, may be the same, or substantially the same, as the node 400 of FIG. 4.

While example embodiments of the present invention have been described in detail, it should be understood that various changes, substitutions and alterations may be made herein without departing from the scope of the invention.

What is claimed is:

1. A method of operating a bus system comprising:
   receiving data from a transmitting node via a bus;
   detecting a transmission error in a data header of the received data;
   ceasing to receive the data and releasing the bus in response to the detected transmission error; and
   notifying the transmitting node and at least one second receiving node, which has not already detected the transmission error, of the detected transmission error.

2. The method of claim 1, wherein the received data is received by a lower layer of at least one first receiving node, the transmission error is detected at an upper layer of the at least one first receiving node, and method further includes,
   notifying the lower layer of the at least one first receiving node of the detected transmission error, and
   ceasing to receive data and releasing the bus, at the lower layer of the at least one first receiving node, in response to the notification of the detected transmission error.

3. The method of claim 2, wherein the lower layer of the at least one first receiving node is a physical layer coupled to the bus, and the upper layer of the at least one first receiving node is a logical layer for processing the received data received by the lower layer.

4. The method of claim 3, wherein the physical layer is a PHY layer of an IEEE-1394 standard and the logical layer is a LINK layer of the IEEE-1394 standard.

5. The method of claim 2, wherein the notifying the lower layer of the at least one first receiving node of the detected transmission error further includes,
   setting at least one bit of a register to a value, wherein the at least one bit having the value is indicative of the detected transmission error.

6. The method of claim 5, wherein the at least one bit of the register is at least one reserved bit in a register map and the at least one bit is set using a write signal.

7. The method of claim 2, wherein the ceasing to receive the data and releasing the bus by the at least one first receiving node further includes,
   transitioning the lower layer of the at least one first receiving node to an idle state.

8. The method of claim 1, wherein the transmitting node and the at least one second receiving node receive the notification of the detected transmission error via a second lower layer and a third lower layer, respectively.

9. The method of claim 8, wherein each of the second lower layer and the third lower layer is a physical layer coupled to the bus.

10. The method of claim 9, wherein the physical layer is a PHY layer of an IEEE-1394 standard.

11. The method of claim 1, wherein the transmission error is a cyclic redundancy check (CRC) error, and the detecting of the transmission error further includes,
    performing a cyclic redundancy check (CRC) on the received data to detect the transmission error.

12. The method of claim 1, wherein the notifying the transmitting node and the at least one second receiving node of the detected transmission error further includes,
    outputting a reset signal indicative of the detected transmission error to the transmitting node and the at least one second receiving node.

13. The method of claim 12, wherein the reset signal is a non-arbitrated short bus reset signal (SBR).

14. The method of claim 1, wherein the notifying the transmitting node and the at least one second receiving node further includes,
    generating, by the transmitting node and the at least one second receiving node, a reset signal indicative of the detected transmission error, and
    repeating, by the transmitting node and the at least one second receiving node, the reset signal to notify lower nodes of the transmitting node and the at least one second receiving node of the detected transmission error, respectively.

15. The method of claim 1, further including,
    ceasing to transmit the data, releasing the bus, at the transmitting node and repeating the notification of the detected transmission error to a second upper layer of the transmitting node in response to the notification of the detected transmission error from the at least one first receiving node, and
    ceasing to receive the data, releasing the bus, at the at least one second receiving node, and repeating the notification of the detected transmission error to a third upper layer of the at least one second receiving node in response to the notification of the detected transmission error from the at least one first receiving node.

16. The method of claim 15, wherein the ceasing to transmit the data and releasing the bus at the transmitting node further includes, transitioning the transmitting node to an idle state.

17. The method of claim 15, wherein the ceasing to receive the data and releasing the bus at the at least one second receiving node further includes, transitioning the at least one second receiving node to an idle state.

18. The method of claim 15, wherein the transmitting node receives the notification of the detected transmission error via a second lower layer and the repeating the notification to the second upper layer of the transmitting node includes, setting at least one bit of a register of the second lower layer of the transmitting node to a value, and sending a signal to the second upper layer of the transmitting node.

19. The method of claim 18, wherein the at least one bit of the register of the second lower layer of the transmitting node is at least one reserved bit in a register map and the signal is a link signal.

20. The method of claim 15, wherein the at least one second receiving node receives the notification of the detected transmission error via a third lower layer and the repeating the notification to a third upper layer of the at least one second receiving node of the detected transmission error includes, setting at least one bit of a register of the third lower layer to a value, and sending a signal to the third upper layer.

21. The method of claim 20, wherein the at least one bit of the register of the third lower layer is at least one reserved bit in a register map and the signal is a link signal.

22. A bus system comprising:

a bus;

a transmitting node adapted to transmit data over the bus;

at least one first receiving node; and at least one second receiving node; wherein the at least one first receiving node and the at least one second receiving node are adapted to receive data over the bus, and wherein the bus system is operated using the method of claim 1.

23. A bus system, comprising:

a transmitting node adapted to transmit data over a bus;

at least one first and at least one second receiving node adapted to receive data over a bus; wherein the at least one first receiving node is adapted to receive data over the bus, detect an transmission error in a data header of the received data, and notify the transmitting node and the at least one second receiving node of the detected transmission error.

* * * * *